United States Patent [19]

Jennings

[11] 4,125,952
[45] Nov. 21, 1978

[54] BUCKET ATTACHMENT

[76] Inventor: Willie L. Jennings, Rt. 1, Box 163, Morriston, Fla. 32668

[21] Appl. No.: 841,891

[22] Filed: Oct. 13, 1977

[51] Int. Cl.² .............................. B66F 9/00; E02F 3/70
[52] U.S. Cl. ................................ 37/117.5; 37/DIG. 3; 214/145 A; 214/131 A
[58] Field of Search ................... 37/117.5, 103, 142 R, 37/DIG. 3; 214/145, 131 A, 138 C, 670, 620; 172/272

[56] References Cited

U.S. PATENT DOCUMENTS

| | | | |
|---|---|---|---|
| 2,705,380 | 4/1955 | Hensley | 37/142 R X |
| 2,838,856 | 6/1958 | Buisse | 37/142 R |
| 3,325,023 | 6/1967 | Coleman | 214/145 |
| 3,349,933 | 10/1967 | Simpson et al. | 214/145 |
| 3,706,388 | 12/1972 | Westendorf | 214/145 |
| 3,795,070 | 3/1974 | Bronson et al. | 37/117.5 |
| 3,795,331 | 3/1974 | Guest | 214/145 |
| 3,834,567 | 9/1974 | Miller | 214/145 |
| 3,908,844 | 9/1975 | Duffield | 214/145 |
| 3,975,844 | 8/1976 | Olson | 37/117.5 |
| 4,038,766 | 8/1977 | Felstet | 37/117.5 X |

Primary Examiner—E. H. Eickholt
Attorney, Agent, or Firm—Roger L. Martin

[57] ABSTRACT

An attachment for power operated buckets, in the form of a forked type implement, is shown as supported on the leading edge of the bucket. The implement is suspended, through the provision of intermediate slot forming components, on the leading edge of the bucket by cantilever principles involving a rear portion which bears against the bottom wall of the bucket and a work load supported forwardly of the slot forming components. Hinge components are utilized for attaching the rear portion to the back wall structure of the bucket.

The hinges serve to maintain the leading edge in the groove and have hinge plates that are manipulatable between the horizontal and upright positions so that attachment to the back wall can be realized in the upright position and insertion and withdrawal of the leading edge from the groove accomplished in the horizontal position. Adjustable features for the hinges are shown so that attachment of the implement to different types of buckets may be accomplished.

7 Claims, 8 Drawing Figures

BUCKET ATTACHMENT

BACKGROUND OF THE INVENTION

The invention relates to attachments or implements for scoops or buckets that are commonly used in the handling of particulate materials.

Vehicles equipped with bucket-carrying arms that are power operated to manipulate the bucket for the handling of particulate materials are known. The so-called "front-end loaders" used in loading earth hauling equipment with sand, gravel and landfill are typical examples of equipment that may be modifies through the use of the principles of the invention contemplated herein.

Such loaders, although admirably suited for handling particulate materials, are somewhat less than satisfactory when it comes to clearing land of tree stumps, roots and large rocks, or when it comes to handling other articles such as hay bales that are unable to fit into the bucket of the loader. To better adapt such loaders to the handling of oversized items, various implements have been advocated for use as attachments to the bucket component of the loaders.

Such implements usually take on the form of a tine-type attachment that has a frontal portion located in the front of the bucket and on which the work load is supported in the handling process. These implements are usually supported on the bottom wall of the bucket by means of a structure which overlies the leading edge of the bottom wall and which cooperates with other structures in the attachment in forming a slot or groove in which the leading edge is received. The working load on the front end portion of the implement is counterbalanced by a rear portion that underlies and bears against the bottom wall so that most of such implements are so designed on cantilever principles.

Several methods have been advocated for maintaining the leading edge of the bucket in the slot or groove of the implement. In some cases, the prior art has advocated clamping arrangements that call for some type of structure which serves to clamp the bottom wall between the underlying rear portion of the implement and that structure which overlies the bottom wall of the bucket. Such clamping arrangements loosen during use, permit movements of the implement relative to the bucket, and are generally unsafe and unsatisfactory.

In other cases, the prior art has advocated the use of fasteners that extend through the bottom wall of the bucket so as to mechanically interconnect the attachment structure that overlies and underlies the bottom wall. This approach provides a relatively safely attached structure but it entails the use of considerable effort and time to manually attach the implement to the bucket. The implement, when detached from the bucket, is normally stored in a ground supported position so that the initial step in assembling the bucket and attachment is one of first manipulating the leading edge of the attachment into the groove. Once this is done, the bucket is raised and pivoted around its horizontal pivot axis so that the implement hangs from the leading edge. In this position, the bottom wall underlying structure of the implement is accessible for manipulation by a worker. It will be appreciated that the attachments of the kind contemplated are exceedingly heavy structures which, in such hanging positions, require considerable effort and time in order to align the holes in the bucket wall with the attachment structure for reception of the fasteners. It is also unsafe to manipulate the hanging implements under such circumstances, for the possibility of the structure falling on the operator during the fastening operation is always existent. This approach to fastening such implements to the bucket also has certain other disadvantages in that the holes in the bottom walls of the bucket tend to weaken the walls. These holes also remain after the attachment is removed from the bucket. As such, in the normal use of the bucket, the particulate materials tend to flow through the holes and become scattered in the work areas, a fact which creates unnecessary clean-up problems in many instances.

Yet another method which has been advocated for securing the cantilever type structures to the bucket is to use flexible members, such as chains, wire ropes the the like, and which are fastened to the bucket wall underlying structure of the implement at one end, and at the other end to a hook or similar device that fits over an edge of the top wall of the bucket. This approach to the implement fastening problem usually entails tha use of an overcenter arm or turn-buckle type device for adjusting the overall length of the fastener. Such approaches avoid the need for lifting the bucket and implement in order to secure the latter to the former, and less effort is usually involved in the fastening procedure as compared to those situations where metal fasteners that penetrate the bucket wall are utilized. However, it is usually difficult with such structures to provide a taunt connection and as such, movement of the attachment relative to the bucket is frequently encountered in use. This causes wear of parts and lacks the securely fixed structural arrangements that instills confidence in operators who must rely on the integrity of such fastening means for their personal safety. Apart from the above, the overcenter tightening devices can be inadvertently released through encounters with limbs, etcetera during use of the implements.

SUMMARY OF THE INVENTION

The safest and most reliable method for attaching such implements to the buckets, in order to retain the leading edge in the slot or groove of such structures is through the use of metal fasteners that engage a wall component of the bucket. The walls of such buckets are usually reinforced with rib components or similar structures that provide points for pivotally attaching the support arms and powered components for manipulating the bucket during normal use. These wall rib components or brackets may serve as points for attaching the implements to the bucket. The metal fasteners used, although engaging a bucket wall component, nevertheless avoid the need for an aperture that communicates between the interior and exterior of the bucket.

The problem with using such points of attachment however, lies in the fact that the front and rear end portions of the implements are basically oriented in a common plane, so that any structure which connects with the back wall ribs must rise above the plane or the rear and front portions of the implement. Such rising structure interferes with the insertion and withdrawal of the leading edge of the bucket into and from the groove or slot forming structural components of the attachment during the process of attaching and detaching the implement from the bucket.

The inventor solves this problem of satisfactorily attaching the implements through the use of a pair of hinged components that are secured to the rear portion of the implement. The hinge plates of these components may be pivotally moved between generally horizontal and vertical positions. At the horizontal position, the arrangements of the plates are such as to avoid interference with the insertion and removal of the leading edge structure from the slot or groove forming structure of the implement. In the upright position, however, the arrangements are such that the hinge plates may be secured to the bracket structures of the back wall by the use of simple pin or bolt type metal fasteners to provide the secure attachment desired.

In accord with certain aspects of the invention, the inventor contempletes a fixed mounting arrangement for the hinge components at positions where the hinge plates will assume a working alignment with the braceet structure of the bucket walls. On the other hand, other aspects of the invention contemplate an adjustable mounting for the hinges so that they can be moved relative to the body structure of the implement, and thus, adapt it for attachment to different buckets with differing bracket arrangements.

A general object of the invention is to provide an improved implement for bucket devices that are normally used in the handling of particulate materials.

A further object of the invention is to provide an implement of the kind contemplated which is safe to use and inexpensive to manufacture.

A further object of the invention is to provide an implement of the kind contemplated which is adaptable for attachment to powered buckets with lugs or ribs that vary in spacing from one bucket to the next.

A further object of the invention is to provide a means of attaching an implement of the kind contemplated which avoids modification of the bucket in a manner which might structurally weaken said bucket.

Yet a further object of the invention is to provide an improved means to secure the implement or attachment fixedly to the bucket so that the wear of parts is minimized.

One particular object is to provide a means for securing implements of the kind contemplated to buckets and which permits the implement to be secured to the back wall of the bucket by structure that does not interfere with the reception of the leading edge of the bucket in the groove component of the implement.

Still further objects of the invention are to provide a simple, inexpensive and long-lasting implement fot the bucket of a material handler which can be used to handle and move cylindrical and baled hay, rocks, boulders, manure, sillage and other materials requiring the use of a forked attachment.

BRIEF DESCRIPTION OF THE DRAWINGS

The novel features that are considered characteristic of the invention are set forth with particularity in the appended claims, the invention together with additional objects and advantages thereof, will best be understood from the following description when read in connection with the accompanying drawings, and in which:

DESCRIPTION OF THE EMBODIMENTS

Figure 1:
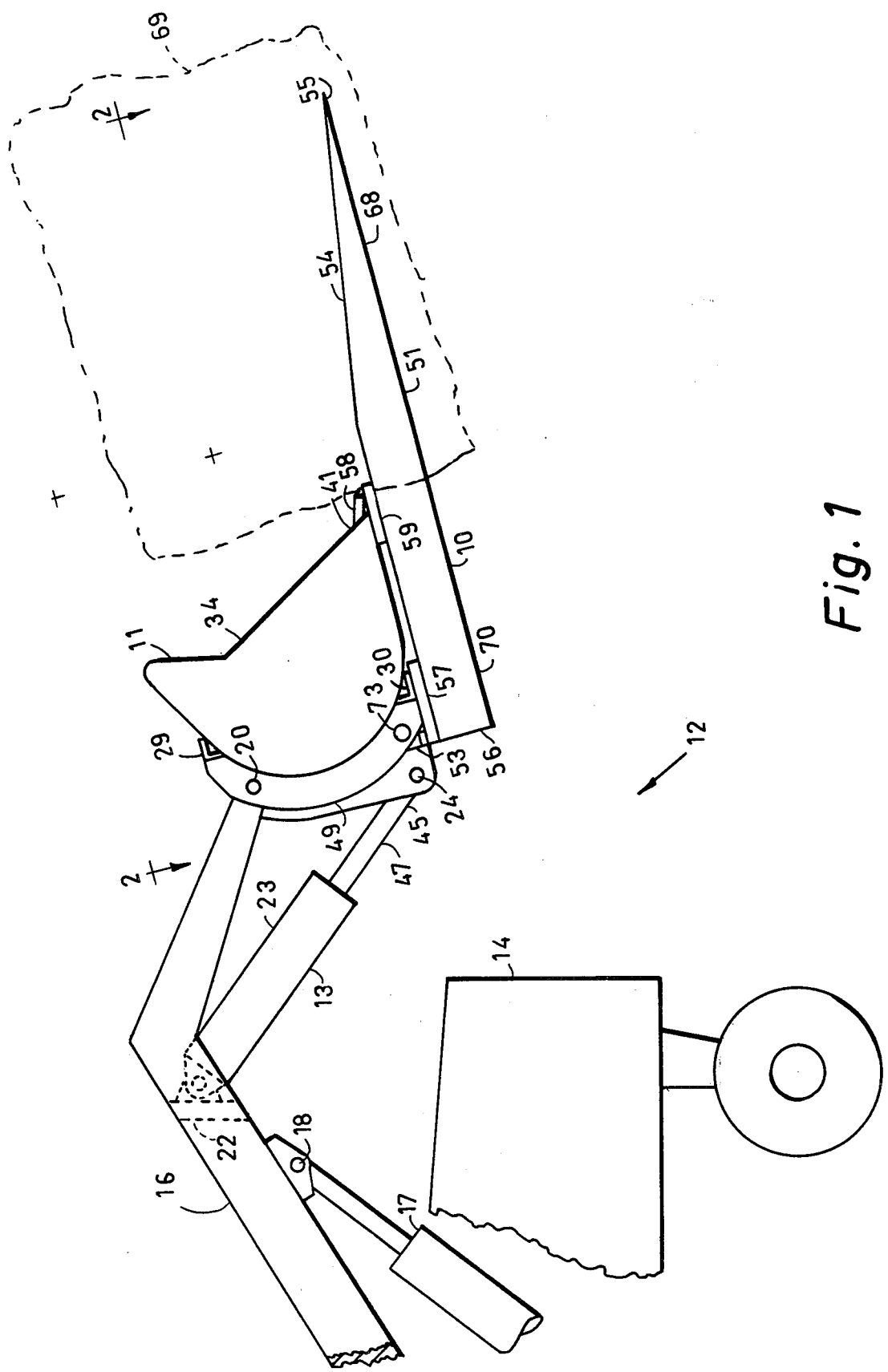
FIG. 1 is a side elevational view illustrating an implement embodying the principles of the invention as seen when attached to the bucket of a conventional so-called "front-end loader", certain parts being broken away and a supported work load being illustrated in broken lines.
Figure 2:
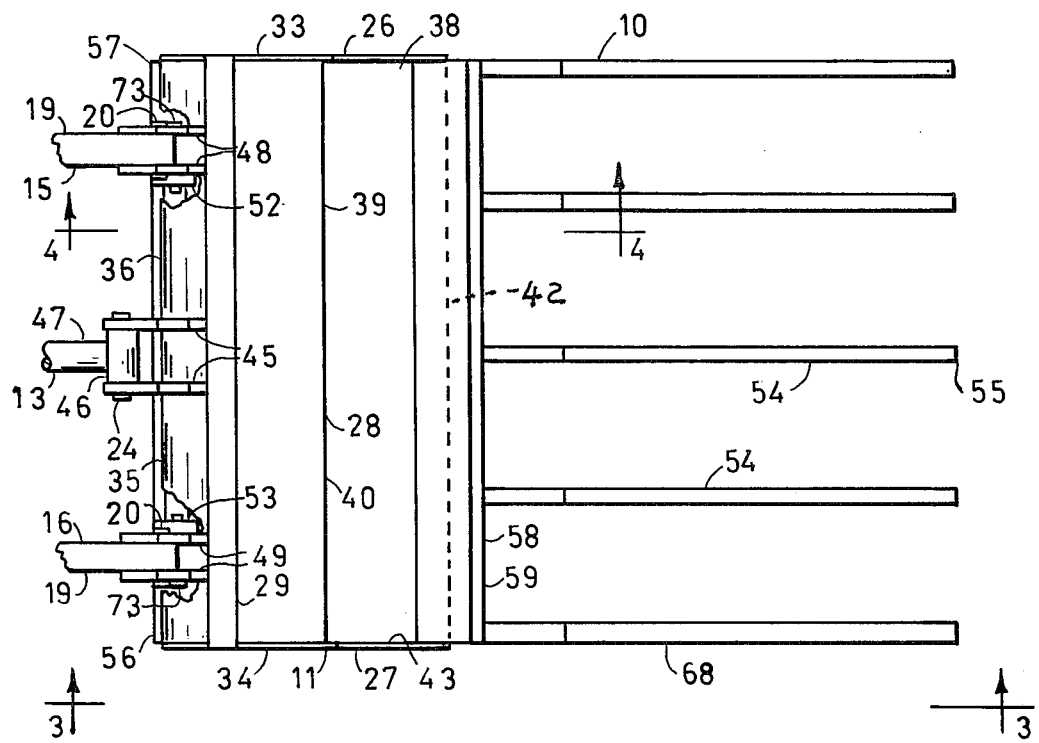
FIG. 2 is a top plan view taken generally along the lines 2—2 of FIG. 1.
Figure 6:
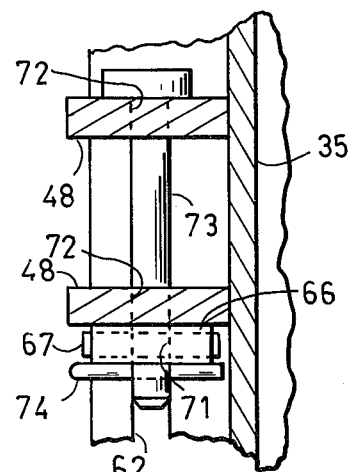
FIG. 6 is an enlarged section showing a fragment generally along the lines 6—6 of FIG. 4.
Figure 3:
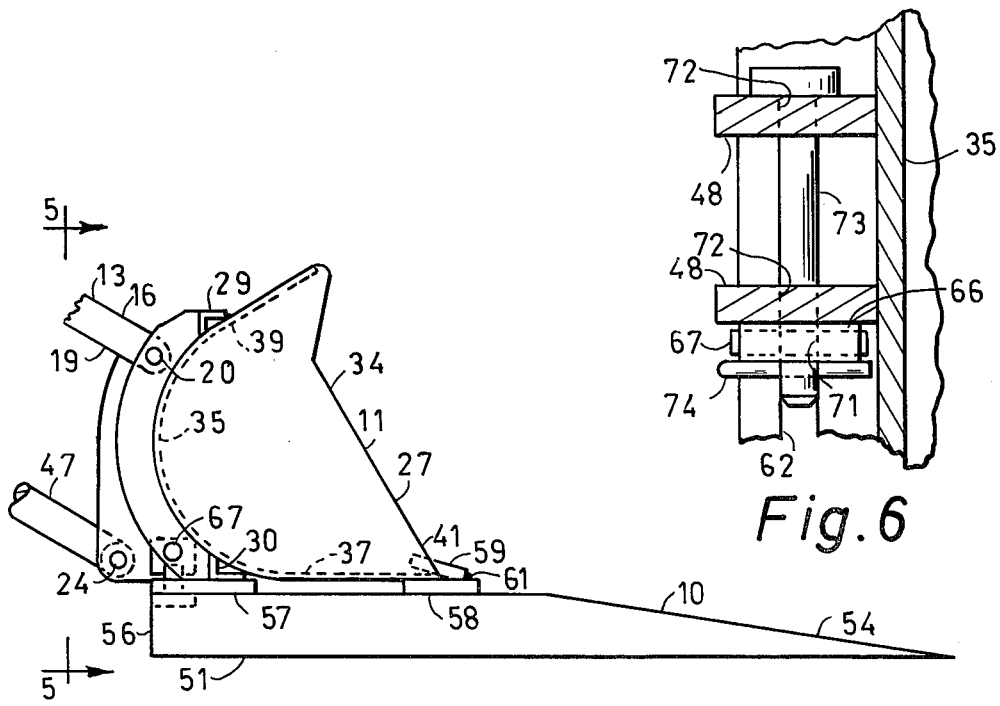
FIG. 3 is a side elevational view taken generally along the lines 3—3 of FIG. 2.

Reference is now made to the drawings and whereing an embodiment of the invention is shown in FIGS. 1 thru 7 in the form of a forked type implement 10 which is seen in FIGS. 1 thru 5 as attached to the scoop or bucket 11 of a conventional front-end loader 12.

The loader 12 includes an hydraulically powered mechanism 13 for manipulating the bucket 11. This mechanism 13 is mounted on a tractor type self-propelled vehicle component 14 of the loader. Mechanism 13 includes a pair of arms 15 and 16, which are pivotally mounted at their rear ends at opposite sides of the vehicle by conventional means (not shown). The arms are pivotally raised and lowered through the control of a pair of hydraulic cylinders 17 that are connected to a suitable source of pressurized fluid on the vehicle 4 and pivotally connected to the arms 15 and 16 by pivot elements 18. The front ends 19 of the arms are pivotally connected to the bucket 11 by means of aligned and transversely spaced apart pivot elements designated at 20. These pivot elements 20 establish a transverse axis 21 for pivotal movement of the bucket 11. The arms 15 and 16 are rigidly interconnected by a cross piece 22, and mechanism 13 is provided with another hydraulic cylinder 23 for pivotally moving the bucket 11 about the axis 21. The base of the cylinder 23 is pivotally connected to the cross piece 22 and the piston arm 47 is connected to the bucket by means of a pivot element 24.

Bucket 11 is constructed from metal plates 26, 27 and 28, a pair of angle members 29 and 30, and a plurality of arcuate metal ribs that provide reinforcement for plate 28 and also provide suitable bracket arrangements for use in connecting the implement 10 and the mechanism 13 to the bucket 11. Plates 26 and 27 are spaced apart and cut to the configurations evident in FIGS. 1 and 3, and form the opposite side walls 33 and 34 of the bucket. Plate 28 extends transversely and is welded at its opposite ends to the side plates 26 and 27. Plate 28 has an arcuately bent section 35 to the exterior of which the arcuate ribs 31 are welded to and form the back wall 36 of the bucket. It also has a flat section 39 that forms an incline top wall component 40. The mouth 43 of the bucket opens forwardly at the front end of the bucket 11, and here, the plate section 37 terminates at the bottom wall in a transversely extending leading edge 42 from which the implement is suspended, as will be subsequently seen.

Angles 29 and 30 are arranged transversely and in parallel in the assembled bucket and are welded to the exterior of plate 28 at the junctures between plate sections 35 and 39 and plate sections 35 and 37 respectively. The reinforcing ribs are welded to the arcuate plate section 35 between the angle members 29 and 30. Intermediate the side plates 26 and 27 is a pair of ribs 45 that are spaced apart to accomodate a cylindrical sleeve 46 that is fixed to the end of the piston arm 47 of cylinder 231. These ribs 45 provide a bracket arrangement that facilitates a pivotal connection of the arm 47 to the back wall 36, as by means of pivot element 24. The back wall 36 also has a pair of transversely spaced apart rib pairs 48 and 49 that are arranged to accommodate the front ends 19 of the lift arms 15 and 16. Here, the arms 15 and 16 are pivotally connected to the back wall 36 by the aligned pivot elements 20 that establish the pivot axis 21 for the pivotal movement of the bucket with respect to the lift arms.

Figure 7:
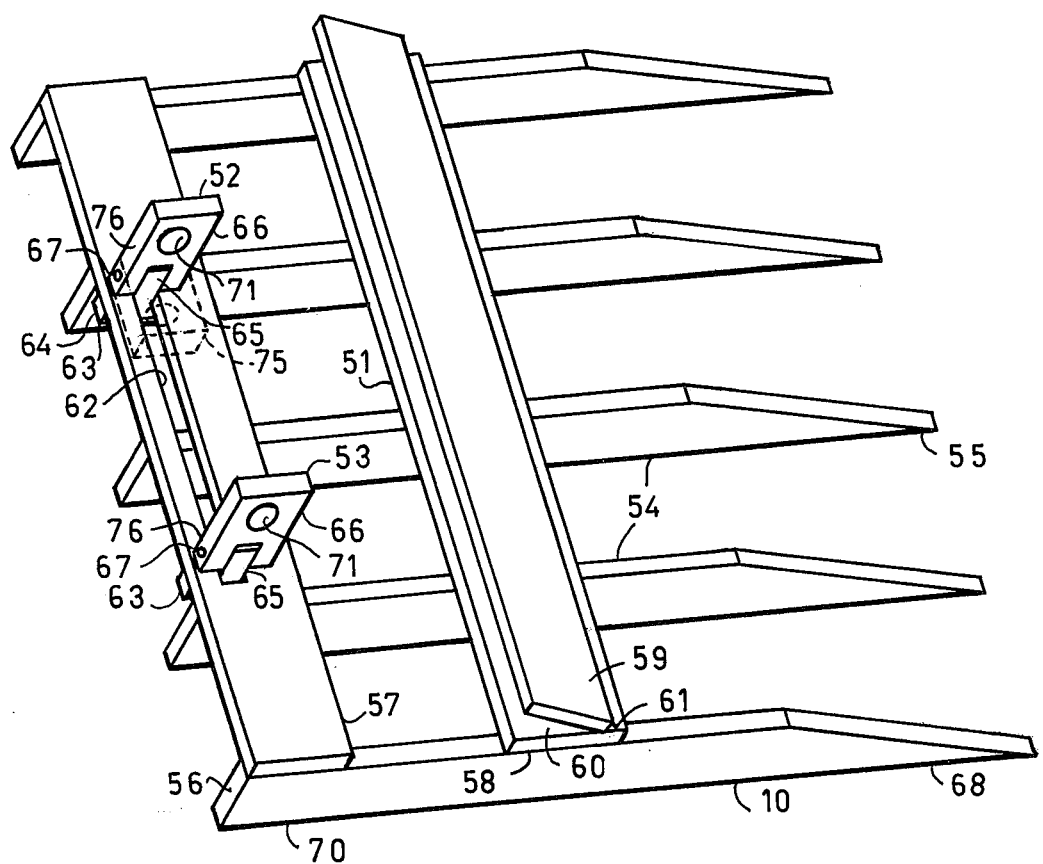
FIG. 7 is an isometric view of the implement as seen when detached from the bucket.

The structure of the fork type bucket attachment 10 is best seen in FIG. 7. It includes a rigid body structure 51 and a pair of hinge components 52 and 53 that are used in connecting the body 51 to the bucket 11.

The body 51 of the implement 10 includes a plurality of elongated metal tine elements 54 which are laterally spaced apart in parallel and generally arranged in a common plane. At the front end 55 of the implement 10, the tines 54 have tapered ends to facilitate use of the structure, and at the back end 56 of the implement 10, the tines are rigidly interconnected by an elongated flat metal plate 57 that is arranged transversely and welded to each tine. Generally intermediate the front and rear ends 55 and 56 of the fork type assembly 10 is another elongated transversely arranged metal plate component 58 of the body structure 51. This plate 58 is also rigidly welded to each tine. Plate 58 is arranged to underlie the leading edge 42 of the bottom wall 38 when the implement is attached to the bucket and it is joined by a weld 61 to another elongated plate 59 that is inclined to plate 58 so as to provide an elongated transversely extending and rearwardly opening slot or groove 60 for reception of the leading edge portion of the bottom wall.

Figure 5:
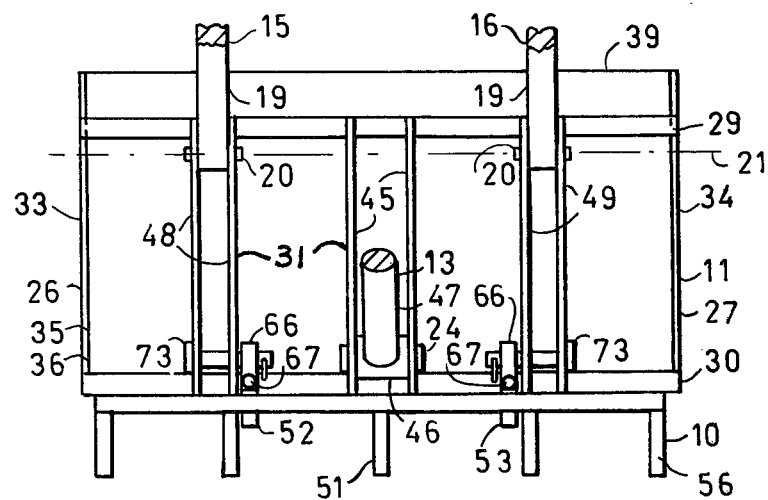
FIG. 5 is a rear elevational view taken generally along the lines 5—5 of FIG. 2.
Figure 4:
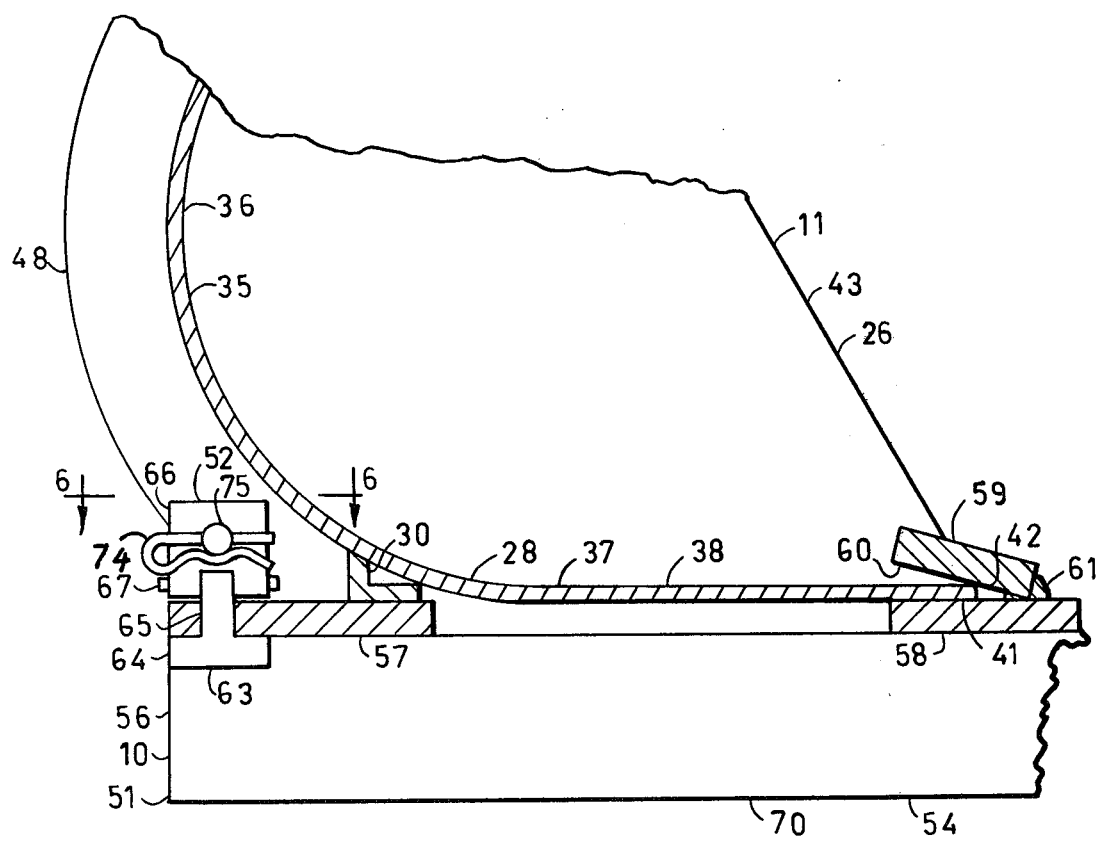
FIG. 4 is an enlarged sectional view showing a fragment of the bucket and implement as seen generally along the lines 4—4 of FIG. 2.

The hinge component 52 and 53 in the embodiment illustrated in FIGS. 1 thru 7 are slidably mounted on the body structure 51 to facilitate their adjustment to the locations of the bracket forming ribs of the bucket. To facilitate the mounting, plate 57 has an elongated slot 62 and each hinge component has a T-shaped member 63 with its opposite legs 64 arranged to underlie the plate 57 in the assembled implement while the third leg 65 projects upwardly through the slot 64 and is pivotally secured to the hinge plate 66 by means of a pivot pin 67. Pin 67 engages the leg 65 and the hinge plate 66 at the top side of plate 57. This arrangement enables the hinges 52 and 53 to be slidably moved transversely of the body structure 51 within the limitations imposed by the slot arrangement and to position adjacent the rib pairs 48 and 49. Here, each of the hinge plates is fastened to the bucket back wall by means of pins 73. Each pin 73 extends through aligned holes 72 in the adjacent ribs and through a hole 71 in the hinge plate of the component. As best seen in FIGS. 4 and 5, these pins 73 are retained in position by removable clamp type end retaining pins 74.

The arrangement of the implement 10 when attached to the bucket 11 is best illustrated in FIGS. 1 thru 6 and where it is apparent that the body structure 51 is basically suspended from the leading edge 42 of the bucket when the leading edge 42 is received in the groove 60. The front end portion 68 of the body structure 51 is adapted to support the work load, such as the hay bale 69 (FIG. 1), in front of the leading edge. As thus secured to the bucket 11, the rear end portion 70 of the body structure 51 underlies and bears against the bottom wall 38 to counterbalance the load on the front end portion 68.

The main function of the hinge components is to prevent the body structure from shifting forwardly relative to the bucket and thus to prevent the leading edge 42 from being dislodged or withdrawn from the groove 60.

The implement, as seen in FIG. 7 is shown in a ground supported position. In the process of attaching the implement 10 to the bucket 11, the bucket 11 of the front end loader 12 is manipulated into a position at which the leading edge 42 of the bottom wall 38 is insertable in the groove 60 of the implement. Prior to this, the hinge plates 66 of the hinge components 52 and 53 are pivoted to horizontal position, such as illustrated at 75 for hinge component 52, so that as the leading edge 42 is thereafter inserted in the groove 60, the hinge plates 66 form no obstruction to the movement of the edge into the slot received position. Thereafter, with the leading edge 42 received in the slot 60, the hinge plates 66 are pivoted to their vertical positions 76 and slidably adjusted in the slot until the hinge plates 66 facially confront the inside ribs of the rib pairs 48 and 49 and whereat the holes 72 in the ribs are aligned with the hinge plate holes 71. Thereafter, the pins 73 may be inserted in the aligned holes and the retaining pins 74 inserted to maintain the pins 73 in place.

Figure 8:
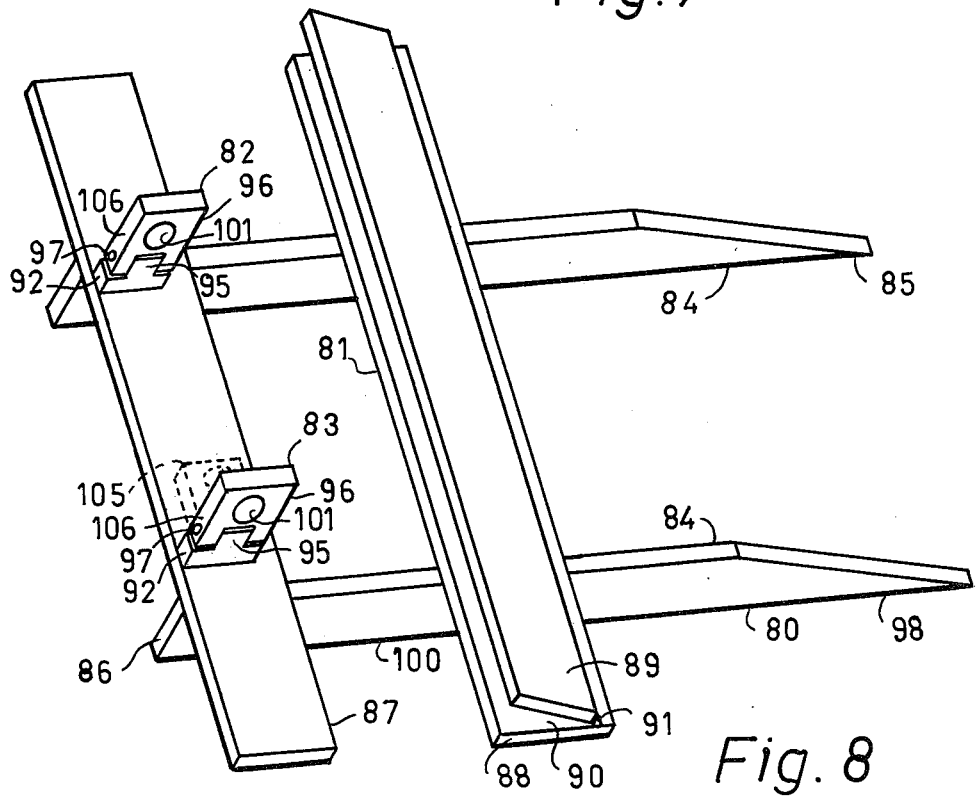
FIG. 8 is an isometric view of another implement embodying certain principles of the invention.

Another embodiment of the invention is shown in FIG. 8 of the drawings. Here, the attachment or implement 80 includes a rigid body structure 81 which is equipped with a pair of hinge components 82 and 83 that are spaced apart and are fixed to the body structure 81. The body structure 81 comprises a pair of laterally spaced apart parallel tine elements 84 which are arranged in a generally common plane. At the front end 85 of the implement 80, the tines 84 have tapered ends which facilitate the use of the structure. At the back end 86 of the implement 80, the tines are interconnected by an elongated flat metal plate 87 that is arranged transversely and welded to each tine. Generally intermediate the front and rear ends 85 and 86 lies another elongated transversely arranged elongated plate 88 which is rigidly welded to each tine 84. This plate 88 underlies, and is joined by means of a weld 91 to still another transversely arranged elongated plate 89 which is inclined with respect to the plate 88 so as to provide an elongated transversely extending slot or groove area 90, which opens rearwardly for the reception of the leading edge portion of the bucket.

Each of the hinge components 82 and 83 of the implement 80 has a hinge plate 96 with a hole 101 therethrough for a pin, and a T-shaped base member 12 which is welded to the plate 87 as seen in the drawings. The upright leg member 95 of the base plate 92 is pivotally attached to the hinge plate 96 by a pin 97 which allows the hinge plate to lie in a horizontal position 105 during the alignment and subsequent insertion of the bucket edge into the transverse groove 90. Once the leading edge has been received in the groove, the operator merely pivots the hinge plates 96 to a vertical position 106 for attachment of the hinge plate to the bucket by means of a suitable pin (not shown).

When the implement 80 is attached to a bucket, the leading edge of the bucket is received in the groove 90 and the front end portion 98 extends beyond the intermediate plate 88 in a working position to support a load. The rear end portion 100 of the implement 80 under such circumstances underlies the bottom wall of the bucket and the hinge component 82 and 83 firmly hold the implement to the bucket so that a minimum of movement and thus, wear is experienced in the use of the implement for handling items.

The embodiment illustrated in FIG. 8 lacks the adaptability for attachment to buckets having differently spaced apart arm brackets. However, by simply welding properly spaced apart lugs to the back wall of the bucket so as to confront the hinge plates, the implement can be readily attached.

From the foregoing, it will be seen that through the use of the hinge arrangement, the implements may be readily attached and detached from the buckets without encountering the prior art problems previously alluded to.

While only certain preferred embodiments of this invention have been shown and described by way of illustration, many modifications will occur to those skilled in the art and it is, therefore, desired that it be understood that it is intended herein to cover all such modifications as fall within the true spirit and scope of this invention.

What is claimed as new and what it is desired to secure by Letters Patent of the United States is:

1. An attachment for a power operated bucket having a bottom wall that terminates at its front end in a transversely extending leading edge, and a back wall that is rearwardly offset from the leading edge and rises above said bottom wall, said attachment comprising a rigid structure having slot forming means adapted to receive said leading edge for suspending the sructure from the bucket, a front end portion for supporting a working load in front of said leading edge, and a rear end portion adapted to underlie said bottom wall; and means for connecting the rigid structure to the back wall comprising a pair of transversely spaced apart hinge components that are secured to said rear end portion, each of said components having a hinge plate that is movable between a generally upright position and a horizontal position and means for fastening the hinge plate to the back wall at its upright position.

2. An attachment in accord with claim 1 wherein said hinge components are fixed to said rear end portion.

3. An attachment in accord with claim 1 wherein said hinge components are secured for adjusting movement relative to said rear end portion.

4. An attachment in accord with claim 1 wherein said hinge components are mounted for transverse adjusting movement relative to said rear end portion.

5. An attachment in accord with claim 1 wherein said rigid structure comprises a plurality of elongated metal tines that have opposite ends and are laterally spaced apart and arranged in parallel, an elongated transversely arranged metal plate fixed to said tines generally intermediate their opposite ends and adapted for location beneath said transversely leading edge when said leading edge is received in said slot, and an elongated transversely arranged metal plate adapted for location above said transversely extending leading edge when said edge is received in said slot.

6. An attachment in accord with claim 1 wherein said rear end portion has an elongated transversely arranged horizontal metal plate having an elongated transversely arranged slot, wherein each of said hinge components comprises means bearing against said horizontal plate and extending through said transversely arranged slot, and a hinge pin pivotally connecting the hinge plate of the component to said bearing means.

7. An attachment for a power operated bucket having a bottom wall that terminates at its front end in a transversely extending leading edge, and a back wall that is rearwardly offset from the leading edge and rises above said bottom wall, said attachment comprising a rigid structure having slot forming means adapted to receive said leading edge for suspending the structure from the bucket, a front end portion for supporting a working load in front of said leading edge, and a rear end portion adapted to underlie said bottom wall, said attachment further comprising means for connecting the rigid structure to the back wall that includes a pair of transversely spaced apart hinge components which are secured to said rear end portion, each of said components having a hinge plate that is movable between a generally upright position and a horizontal position and means for fastening the hinge plate to the back wall at its upright position, said rigid structure comprises a plurality of elongated metal tines that have opposite ends and are laterally spaced apart and arranged in parallel, an elongated transversely arranged metal plate fixed to said tines generally intermediate their opposite ends and adapted for location beneath said transversely extending leading edge when said leading edge is received in said slot, and an elongated transversely arranged metal plate adapted for location above said transversely extending leading edge when said edge is received in said slot, said rear end portion having an elongated transversely arranged horizontal metal plate with an elongated transversely arranged slot, each of said hinge components comprising means bearing against said horizontal plate and extending through the slot therein, and a hinge pin pivotally connecting the hinge plate of the component to said bearing means.

* * * * *